United States Patent Office 3,507,912
Patented Apr. 21, 1970

3,507,912
PROCESS FOR THE PREPARATION OF
BENZENE CARBOXYLIC ACIDS
John D. Behun, Scotch Plains, N.J., and Gerassimos Frangatos, Athens, Greece, assignors to Mobil Oil Corporation, a corporation of New York
No Drawing. Filed Jan. 18, 1966, Ser. No. 521,430
Int. Cl. C07c 63/02
U.S. Cl. 260—524                                10 Claims

ABSTRACT OF THE DISCLOSURE

A process for the cobalt-catalyzed solution oxidation of a methyl benzene compound (e.g., p-xylene) to a benzene carboxylic acid (e.g., terephthalic acid) in the presence of a $C_{4-6}$ aliphatic hydrocarbon (e.g., n-butane) which may promote the reaction and also form an aliphatic carboxylic acid (e.g., acetic acid) using reaction temperatures below 145° C. (preferably about 115–135° C.) and an oxygen-rich gas; the reaction mixture may also contain 2-butanol or a ketone activator.

---

This invention relates to the preparation of benzene carboxylic acids by the catalytic oxidation of methyl-substituted benzene compounds.

The cobalt-catalyzed oxidation of methyl-substituted benzene compounds to the corresponding carboxylic acids is described in the prior art. For example, U.S. 3,036,122 describes a process for preparing benzene carboxylic acids by the cobalt-catalyzed oxidation of methyl-substituted benzene compounds dissolved in a lower fatty acid solvent containing a methylenic ketone. Although that process provides benzene carboxylic acid products of high purity within short reaction times, it would be even more advantageous if such benzene carboxylic acids could be prepared in high purity without need of, or with use of a smaller amount of the expensive methylenic ketone oxidation promoter.

It has now been discovered that the desired oxidation of a methyl-substituted benzene compound can be accomplished by oxidizing the methyl-substituted benzene compound in the presence of a saturated aliphatic hydrocarbon containing from four to six carbon atoms and in the absence of a methylenic ketone or in the presence of a smaller amount thereof. More specifically, the present invention provides a process for the preparation of a benzene carboxylic acid which comprises providing a solution of a methyl-substituted benzene compound in a fatty acid having two to four carbon atoms, said solution containing from about 2% to about 25% of the methyl-substituted benzene compound by weight of the fatty acid, an initial content of from about 0.5% to about 10% by weight of water and a cobalt salt of a fatty acid having two to four carbon atoms in an amount corresponding to about 0.1% to about 1.5% cobalt by weight of the fatty acid, and contacting the solution at a temperature in the range of at least about 100° C. and below 145° C. with a gas containing molecular oxygen at a partial pressure of oxygen of from about 50 to about 1000 pounds per square inch and in the presence of a saturated aliphatic hydrocarbon containing from four to six carbon atoms which is initially present in the solution in a ratio of from about 0.25 to about 5 moles per mole of the methyl-substituted benzene compound.

Although the process of this invention is particularly well suited to the production of benzene dicarboxylic acids, e.g. by the oxidation of p-xylene or m-xylene to terephthalic acid or isophthalic acid, respectively, it is broadly applicable to the oxidation of any compound containing at least one benzene ring having one or more methyl substituents directly attached thereto, and results in the formation of benzene carboxylic acids by the oxidation of the methyl groups to carboxylic acid groups. Typical starting materials, other than the aforementioned p-xylene and m-xylene, include toluene, mesitylene, durene, methyl-substituted benzenes containing other nuclear substituents which are inert to the oxidation process, such as chlorine, bromine or fluorine atoms or nitro, alkoxy, aryloxy or tertiary alkyl groups, and compounds containing more than one benzene ring, e.g. bis(p-tolyl)sulfone, 2,2-bis(p-tolyl)propane), bis(p-tolyl)dimethylsilane, etc. Thus, typical oxidations by the process of this invention include that of toluene to benzoic acid, m-xylene or m-toluic acid to isophthalic acid, p-xylene or p-toluic acid to terephthalic acid, 1,5-dimethyl-2-chlorobenzene to chloroisophthalic acid, 1,4-dimethyl-2-nitrobenzene to nitroterephthalic acid, etc.

The process of the present invention is especially advantageous when the desired product is a dicarboxylic acid which is insoluble in the reaction mixture and which can be easily separated therefrom, e.g. by filtration, with monocarboxylic acids and other intermediate oxidation products remaining in the solution wherein they can be oxidized further at a relatively high rate. Preferably, the oxidation reaction is carried out with the reactant methyl-substituted benzene compound present in an amount ranging from about 2% to about 25%, preferably from about 7% to about 12%, by weight of the fatty acid in the reaction mixture. Although acetic acid is the preferred solvent for the oxidation reaction, the process can alternatively be carried out with propionic or butyric acid or with a mixture of two or three of such acids.

The cobalt catalyst is generally present in the reaction mixture as a soluble cobalt salt, often at an alkanoate corresponding to the fatty acid solvent employed, i.e., cobalt acetate, propionate or butyrate or mixtures thereof. The catalyst is present in a catalytic amount, and usually in an amount of from 0.1% to 1% by weight of cobalt metal, based on the weight of the fatty acid in the reaction mixture. The mixture also initially contains a small amount of water which should be sufficient to prevent precipitation of the cobalt catalyst from the reaction mixture, and which is generally in the range of from about 0.5% to about 10% by weight of the mixture.

The saturated aliphatic hydrocarbon which is used in the process of this invention and which, as aforesaid, contains from four to six carbon atoms, can be a straight-chain or branched-chain hydrocarbon. Thus, the saturated aliphatic hydrocarbon employed in the present invention can be, for example, n-butane, n-pentane, isopentane, isohexanes such as 3-methyl-pentane, etc. Alternatively, the process can be conveniently carried out with a mixture of two or more of such saturated aliphatic hydrocarbons, for example by utilizing one of the commercial grades of such hydrocarbons containing a minor amount of another of such hydrocarbons, e.g. a commercial grade of n-butane which contains several mole percent of isobutane. Most advantageously, the process is carried out with n-butane or 3-methyl-pentane, either with or without one or more of the other saturated aliphatic hydrocarbons which are useful in the present invention.

The saturated aliphatic hydrocarbon can be present in the reaction mixture in any concentration sufficient to increase the yield of product benzene carboxylic acid over the yield obtainable by carrying out the process in the absence of such a saturated aliphatic hydrocarbon or other oxidation promoter. However, it has been found that for operation at advantageously lower pressures, i.e. below 300 pounds per square inch gauge, the yield of benzene carboxylic acid is significantly lowered if the ratio of the saturated aliphatic hydrocarbon to the methyl-substituted benzene compound in the reaction mixture is substantially higher than about 5 to 1. Thus, the saturated aliphatic hydrocarbon is preferably initially present in the process of this invention in a ratio of from about 0.25 to about 5 moles per mole of methylbenzene compound and, in the absence of any other oxidation promoter, in a ratio of from about 1.5 to about 5 moles per mole of methylbenzene compound. When n-butane is used as the sole oxidation promoter in the present process, best results are generally obtained with the initial presence of about 2 moles of n-butane per mole of methylbenzene compound.

The process is carried out at gas pressures of from about 100 to about 1000 pounds per square inch, and preferably with a partial pressure of oxygen ranging from about 100 to about 400 pounds per square inch. While air, or air enriched with oxygen, may be used as the gas containing molecular oxygen, gaseous oxygen of commercial purity is preferred. As aforesaid, the oxidation is carried out at a temperature in the range of at least about 100° C. to about 145° C., but preferably less than 145° C. and more preferably between about 115° C. and about 135° C.

Using the reaction conditions described above, the oxidation process can be carried out with a high degree of conversion, e.g. up to 90% or higher, of the reactant methyl-substituted benzene to the corresponding benzene carboxylic acid product. It has also been found that in the oxidation of xylenes, the present process utilizing a saturated aliphatic hydrocarbon provides phthalic acid products which usually contain a significantly lower percentage of certain undesirable impurities than that found in phthalic acids prepared by the aforedescribed prior art process. For example, the amount of para-carboxybenzaldehyde which is present in terephthalic acid prepared from a reaction mixture containing a saturated aliphatic hydrocarbon containing four to six carbon atoms in accordance with the present invention is, in general, less then the amount present in the product of the prior art process employing a methylenic ketone as a reaction promoter.

Although the process of the present invention does not require any oxidation promoter other than the aforedescribed saturated aliphatic hydrocarbon, it can be carried out with the inclusion of another promoter, e.g. 2-butanol or a methylenic ketone such as methyl ethyl ketone, diethyl ketone, 2,4-pentanedione or 2,5-hexanedione, and the inclusion of a small amount of such an additional promoter may be preferred for some purposes, for example to shorten the time required to achieve a desired degree of oxidation of the methylbenzene starting material. Generally, the amount of such an additional promoter which will significantly shorten the reaction time need not be more than a small fraction of the amount of that oxidation promoter which would be required to provide similar yields of benzene carboxylic acid product when used as a sole oxidation promoter for the cobalt-catalyzed oxidation of methylbenzenes in a lower fatty acid solvent. For example, when the reaction mixture contains methyl ethyl ketone, which is a preferred second oxidation promoter for use in the present process together with the aforedescribed saturated aliphatic hydrocarbon, the reaction time will be substantially shortened if the ketone is present in an amount of at least about 0.1%, preferably from about 0.2% to about 2%, by weight of the fatty acid solvent, whereas obtainment of similar yields of a benzene carboxylic acid product by the prior art process using methyl ethyl ketone as the sole oxidation promoter requires the presence of at least 1%, and preferably from 3% to 10%, of the ketone by weight of the fatty acid solvent.

When a second oxidation promoter, e.g. methyl ethyl ketone, is included in the reaction mixture of the present process, the reaction is preferably terminated before all of the readily reactive methyl groups in the reaction mixture have been oxidized to carboxylic acid groups. The reaction time is usually controlled to avoid exceeding the period required for a predetermined degree of oxidation (generally not more than that of 95% of the methyl groups in the starting material), which insures the preservation of a substantial proportion of the methylenic ketone promoter in the reaction mixture which can be recycled for reuse in the oxidation reaction after the benzene carboxylic acid product has been separated therefrom by a conventional method, e.g. filtration, and after the remainder of the mixture has been otherwise suitably prepared for recycle.

As a further advantage of the present process, it has been discovered that the saturated aliphatic hydrocarbon used therein is also oxidized, during oxidation of the methylbenzene compound, to provide by-products which include a lower fatty acid of the type used as the reaction solvent of the present process. The fatty acid by-product can be retained in the reaction mixture to provide make-up acid for recycle purposes or, if desired, the saturated aliphatic hydrocarbon can be oxidized in the reaction mixture in quantities sufficient to provide the fatty acid by-product in amounts great enough that it can be recovered from the reaction mixture for other uses. For example, when the saturated aliphatic hydrocarbon employed in the process is n-butane, reaction of the mixture in accordance with the present invention can be carried out to oxidize up to 80% or more of the n-butane in the mixture and/or to provide up to one pound or more of acetic acid by-product per pound of n-butane consumed by the oxidation process.

The present invention is further illustrated by the following examples:

EXAMPLE 1

This example illustrates a preferred cobalt-catalyzed oxidation of a methyl-substituted benzene compound to the corresponding benzene carboxylic acid compound using a reaction mixture containing a 2–4 carbon atom-containing fatty acid and a saturated aliphatic hydrocarbon in accordance with the process of this invention.

A one gallon autoclave equipped with a stirrer and an oxygen inlet was charged with 106 grams (1.0 mole) of p-xylene, 25 grams (0.1 mole) of cobalt (II) acetate tetrahydrate, 116 grams (2.0 moles) of n-butane, and one liter of glacial acetic acid. After the autoclave was sealed and pressurized with oxygen up to 120 p.s.i. gauge, the reaction mixture was stirred at 500 r.p.m. and heated to 115° C. The oxygen pressure was then raised to 250 p.s.i. gauge and maintained between 230 and 250 p.s.i. gauge throughout the reaction. After approximately 30 minutes of slow oxygen absorption, the reaction became exothermic and the rate of oxygen absorption increased. External water cooling was applied during the exothermic phase of the reaction to maintain the temperature at approximately 120–125° C. until oxygen absorption ceased. The mixture was then allowed to cool to room temperature. The product, which was isolated by filtering the mixture after it had been reheated to its boiling point, was washed first with hot acetic acid and then with hot water. The solid terephthalic acid product thus separated, after being dried in a laboratory air oven at 100° C. for 16 hours, weighed 150 grams and represented 90% of the theoretical yield. Analysis of the product by a polarographic procedure indicated that it contained 1.2% para-carboxybenzaldehyde.

Comparative Example A

When the procedure of Example 1 was repeated with the exception that the n-butane was omitted and the reaction mixture was maintained at an average temperature of 130° C. throughout the reaction, the yield of terephthalic acid was 61.4 grams, or 37% of the theoretical yield.

Comparative Example B

When the procedure of Example 1 was repeated with the exception that the reaction mixture was maintained at average temperature of 145° C. throughout the reaction, the yield of terephthalic acid was 64.7 grams, or 39% of the theoretical yield.

Comparative Example C

When the procedure of Example 1 was repeated with the exception that 21.6 grams (0.3 mole) of methyl ethyl ketone was substituted for the n-butane and the reaction mixture was maintained at an average temperature of 130° C. throughout the reaction, the yield of terephthalic acid was 148 grams (89% of the theoretical yield), but analysis of the product showed that it contained 2.0% para-carboxybenzaldehyde.

EXAMPLE 2

This example illustrates the effect of using a different saturated aliphatic hydrocarbon in the process of this invention.

The procedure of Example 1 was repeated with the exception that 172 grams (2 moles) of 3-methyl-pentane was substituted for the n-butane. The yield of terephthalic acid was 148 grams, or 89% of the theoretical yield.

EXAMPLE 3

This example illustrates the effect of using a reaction mixture containing two saturated aliphatic hydrocarbons in accordance with the process of this invention.

The procedure of Example 1 was repeated with the exception that the reaction mixture contained 90 grams (1.55 moles) of n-butane and 9.85 grams (0.17 mole) of isobutane. The yield of terephthalic acid was 141 grams, or 85% of the theoretical yield.

EXAMPLE 4

This example illustrates the effect of using a reaction mixture containing a saturated aliphatic hydrocarbon together with a second oxidation promoter, in accordance with the process of this invention.

The procedure of Example 1 was repeated except that the reaction mixture contained 66 grams (1.14 moles) of n-butane and 5.4 grams (.075 mole) of methyl ethyl ketone, and the reaction was begun at 120° C., held below 135° C. throughout the reaction and at approximately 120–125° C. during most of the reaction period. The yield of terephthalic acid was 151 grams, or 91% of the theoretical yield.

Comparative Example D

When the procedure of Example 4 was repeated with the exception that the n-butane was omitted from the reaction mixture, the yield of terephthalic acid was 101 grams, or 61% of the theoretical yield.

Comparative Example E

When the procedure of Example 4 was repeated with the exception that the reaction was carried out at an average temperature of 145° C. and under a pressure of 300 pounds per square inch gauge to insure sufficient oxygen partial pressure, the yield of terephthalic acid was 80 grams, or 48% of the theoretical yield.

EXAMPLE 5

This example illustrates the effect of using a different saturated aliphatic hydrocarbon together with methyl ethyl ketone in the process of this invention.

The procedure of Example 4 was repeated with the exception that 66 grams (0.92 mole) of n-pentane was substituted for the n-butane. The yield of terephthalic acid was 108 grams, or 65% of the theoretical yield.

EXAMPLE 6

This example illustrates the effect of using a saturated aliphatic hydrocarbon and methyl ethyl ketone in a molar ratio different from that used in Examples 4 and 5.

The procedure of Example 4 was repeated with the exception that the reaction mixture contained 100 grams (1.72 moles) of n-butane and 2.75 grams (0.038 mole) of methyl ethyl ketone, and the reaction was begun at 115° C. The yield of terephthalic acid, which contained 1.0% para-carboxybenzaldehyde, was 153 grams (92% of the theoretical yield). Subsequent analysis of the reaction mixture showed that during the oxidation of the p-xylene to terephthalic acid, 81 grams (1.4 moles) of the 100 grams of n-butane originally present in the reaction mixture had been consumed, and that 90 grams (1.5 moles) of acetic acid and 59.4 grams (3.3 moles) of water had been produced.

EXAMPLE 7

This example illustrates the use of a saturated aliphatic hydrocarbon together with a different second oxidation promoter in accordance with the process of this invention.

The procedure of Example 6 was repeated with the exception that 2.8 grams (0.038 mole) of 2-butanol was substituted for the methyl ethyl ketone. The yield of terephthalic acid was 150 grams, or 90% of the theoretical yield.

EXAMPLE 8

This example illustrates the oxidation of a different methyl-substituted benzene compound using a saturated aliphatic hydrocarbon in accordance with the process of this invention.

The procedure of Example 1 was repeated with the exception that 106 grams (1 mole) of m-xylene was substituted for the p-xylene. The yield of isophthalic acid was 134 grams, or 81% of the theoretical yield.

EXAMPLE 9

This example illustrates the oxidation of still another methyl-substituted benzene compound using a saturated aliphatic hydrocarbon in accordance with the process of this invention.

The procedure of Example 8 was repeated with the exception that 120 grams (1 mole) of mesitylene was substituted for the m-xylene. The reaction yield included 78 grams of trimesic acid (37% of the theoretical yield) and 86 grams of uvitic acid (48% of the theoretical yield).

EXAMPLE 10

This example illustrates the oxidation of a methyl-substituted benzene compound containing more than one benzene ring in accordance with the process of this invention.

The procedure of Example 9 was repeated with the exception that 246 grams (1 mole) of bis(p-tolyl)sulfone was substituted for the mesitylene, the reaction mixture initially contained 14.4 grams (0.2 mole) of methyl ethyl ketone, and the mixture was maintained at an average temperature of 120° C. throughout the reaction. The yield of p,p'-sulfonyl dibenzoic acid was 236 grams, or 77% of the theoretical yield.

Although the present invention has been described with preferred embodiments, it should be understood that modifications and variations thereof may be employed without departing from the spirit and scope of this invention, as those skilled in the art will readily understand. Such variations and modifications are therefore considered to be within the purview and scope of the appended claims.

We claim:

1. A process for the preparation of a benzene carboxylic acid which comprises providing a solution of a methyl-substituted benzene compound in a fatty acid having two to four carbon atoms, said solution containing from about 2% to about 25% of the methyl-substituted benzene compound by weight of the fatty acid, a saturated aliphatic hydrocarbon having from four to six carbon atoms and initially present in a ratio of from about 0.25 to about 5 moles per mole of the methyl-substituted benzene compound, an initial content of from about 0.5% to about 10% by weight of water, and a cobalt salt of a fatty acid having two to four carbon atoms in an amount corresponding to about 0.1% to about 1.5% cobalt by weight of the fatty acid, and contacting the solution at a temperature of at least about 100° C. and below 145° C. with a gas containing molecular oxygen at a partial pressure of oxygen of from about 50 to about 1000 pounds per-square inch.

2. A process, as defined in claim 1, in which the saturated aliphatic hydrocarbon is selected from the group consisting of n-butane and 3-methyl-pentane.

3. A process, as defined in claim 1, in which the fatty acid is acetic acid.

4. A process, as defined in claim 1, in which the cobalt salt is cobalt (II) acetate tetrahydrate.

5. A process, as defined in claim 1, in which the methyl-substituted benzene compound is selected from the group consisting of p-xylene and m-xylene.

6. A process, as defined in claim 1, in which the reaction mixture contains an oxidation promoter selected from the group consisting of a methylenic ketone and 2-butanol.

7. A process, as defined in claim 1, in which a substantial proportion of the saturated aliphatic hydrocarbon is oxidized to provide a fatty acid having two to four carbon atoms.

8. A process, as defined in claim 1, in which the methyl-substituted benzene compound is selected from the group consisting of p-xylene and m-xylene, the fatty acid in which the methyl-substituted benzene compound is dissolved is acetic acid, the saturated aliphatic hydrocarbon is initially present in the solution in a ratio of from about 1.5 to about 5 moles per mole of the methyl-substituted benzene compound, and the solution is contacted at a temperature of from about 115° C. to about 135° C. with a gas containing molecular oxygen at a partial pressure of oxygen of from about 100 to about 400 pounds per square inch.

9. A process according to claim 1 in which p-xylene is oxidized to terephthalic acid in a reaction mixture containing acetic acid and n-butane.

10. A process, as defined in claim 9, in which the charge contains methyl ethyl ketone in an amount equal to between about 0.2 and 2% of the weight of acetic acid and between about 0.25 and 5 moles of n-butane per mole of p-xylene.

References Cited

UNITED STATES PATENTS

| | | | |
|---|---|---|---|
| 2,245,528 | 6/1941 | Loder | 260—524 |
| 3,036,122 | 5/1962 | Ardis et al. | 260—524 |
| 3,215,733 | 11/1965 | MacLean et al. | 260—524 |

BERNARD HELFIN, Primary Examiner

U.S. Cl. X.R.

260—516, 520, 521 448.2